United States Patent

[11] 3,578,976

[72] Inventor Johannes Schunack
Berlin-Lichterfelde, Germany

[21] Appl. No. 662,199
[22] Filed Aug. 21, 1967
[45] Patented May 18, 1971
[73] Assignee Franz Morat G. m. b. H.
Stuttgart-Vaihingen, Germany
[32] Priority Dec. 27, 1966
[33] Germany
[31] M72186

[54] OPTICAL SCANNING DEVICE

12 Claims, 5 Drawing Figs.

[52] U.S. Cl. .......... 250/219, 178/7.6, 250/226, 340/173
[51] Int. Cl. .......... G01n 21/30, G01j 3/50
[50] Field of Search .......... 250/2.2, 219, 226, 208; 340/173; 178/6, 7.6

[56] References Cited

UNITED STATES PATENTS

| | | | |
|---|---|---|---|
| 3,138,783 | 6/1964 | Toulmin .......... | 340/173 |
| 3,176,141 | 3/1965 | Siegemund .......... | 250/226X |

*Primary Examiner*—Roy Lake
*Assistant Examiner*—E. R. La Roche
*Attorney*—Michael S. Striker

ABSTRACT: An arrangement for recording on programming tape the color pattern of, for example, fabric material. A scanning head having photosensitive apparatus scans the color pattern to be recorded on the tape, in a grid fashion. The photosensitive apparatus detects the colors on the pattern and converts the optical signals thus realized into corresponding electrical signals. After amplification, these signals from the photosensitive apparatus are converted into normalized pulses by being passed through pulse shapers. The latter provide pulses of constant amplitude and duration in the form of rectangular-shaped pulses. The latter are then applied to a color recognition circuit which provides a signal permitting recording on the programming tape when all designated colors on the pattern have been recognized. Through a systematic and orderly sequence of scanning and tape recording locations, the pattern and its color information is transferred onto the tape. This programming tape may then be used for controlling various machines, as for example, knitting or weaving machines for knitting or weaving predetermined color patterns.

Inventor
Johannes Schmacke
by Michael J. Striker
Atty

Inventor

By

OPTICAL SCANNING DEVICE

BACKGROUND OF THE INVENTION

In accordance with the present invention, the pattern is scanned point-to-point to determine thereby the color or illuminating intensity for the individual grid points or areas. The information realized therefrom is then systematically arranged on a control strip or control tape.

A systematic or orderly arrangement implies the following:

a. In a weaving machine, in which the strands are arranged in accordance with a pattern and/or a plurality of warp threads are inserted so that a particular thread is placed in a particular location;

b. In a warp loom or double-rib loom in which particular loops are ranged in accordance with a desired pattern;

c. In a circular knitting machine which has a number of systems about its needle circle, and in which at least one system of a group of successive or consecutive systems knits one row.

The programmed commands and instructions for controlling these machines are recorded on programming tape. Such programming of machines by means of orderly program tape is not limited to the situations listed in *a* to *c* above. Such machines controlled by the programming tape arranged in a systematic and orderly fashion, may have a number of control locations which must be simultaneously controlled in a step-by-step manner from a single control tape.

In a previous U.S. Pat. application, Ser. No. 601,179 of Dec. 12, 1966 (German application M 67609 VIII*a*/ 21*a*1 D3096), the procedure for systematic arrangement of information on a programming tape, as derived from a scanned pattern, is applicable to a circular knitting machine having a plurality of systems. In such a machine, the control tracks for every row of stitches, are arranged on the programming tape in a stepwise manner corresponding to the knitted row. Every step of the control tape represents, thereby, a knitting needle at a particular location.

In accordance with the previous patent application, above, the scanned pattern, furthermore, was produced with at least two colors. By means of grid scanning the desired pattern was reproduced. A photoelectric arrangement was applied with at least two wavelengths of light for the scanning process. When all scanning wavelengths were involved, the pattern produced a large photosignal. The individual colors gave rise to a large photosignal only by one wavelength, and would give negligibly small photosignals for the other wavelengths.

The pattern to be scanned has a white background, and may also have a color thereon. In the event that the pattern is white, the light of all colors of the visible spectrum are equally reflected. The pattern has superimposed upon it a grid in thin red lines over a two-by-two millimeter area. Every grid area or point can, of course, also have a different magnitude or size. In this grid paper the pattern is applied with different colors. Other material can be used in place of paper for this purpose. Every one of the small quadrants is filled with color representing the color which is to prevail at a particular location on a stitch. The same situation applies when at such a location of a stitch a particular tie or connection is to prevail. This process may, further, be applied to warp looms, double-rib looms, and weaving machines, from the viewpoint of color and tying effects. The patterns used, for example, are:

1. Patterns with the three colors, red, green and blue.
2. Patterns with the two colors, red and green.
3. Patterns with one color, red.

Since white backgrounds are to be represented by a fourth color on the pattern, case 1 above would involve a four-color arrangement or a four-element joint. In case 2 above, there would be a three-color arrangement or a three-element joint. In case 3, a two-color arrangement or two-element joint would prevail.

The colors used to produce a pattern are selected so that when they are scanned they may be readily separated. For the colors, red, green and blue, only the corresponding phototransistor or photocell designated for the particular color, is actuated. When white is being scanned, all three channels become activated.

In the preceding example for a circular knitting machine, a number of rows are scanned simultaneously in accordance with the number of systems to be controlled in a Jacquard circular knitting machine. For example, in a 24-system knitting machine, 1. a four-color pattern involves six rows corresponding to a system number of four;

2. a three-color pattern requires eight rows for a system number of three;

3. a two-color pattern involves 12 rows for a system number of two.

The specific number of rows to be scanned in accordance with the number of systems and number of colors, is already described in the previous patent application mentioned above.

It is an object of the present invention to scan a pattern with phototransistors or cells which are indexed in accordance with a grid arrangement and which provide notably different electrical pulses that may be normalized and recognized. Every light positive or illuminating position of the lighting machine may have transferred to it the resulting pulses for every color. An example of a lighting machine or illuminating machine is provided in the preceding patent application, mentioned above, in FIG. 3. This lighting machine has as many lighting positions as the machine has control positions which represent systems in the circular knitting machine. These lighting positions are, for example, on the circumference of a drum. The control tape or functional film to be illuminated lies upon this drum. The lighting positions are located on the drum in a stepwise manner similar to the arrangement of the control positions. The situation is similar to the systems in a needle circle of a circular knitting machine, in which the separation of a step corresponds to the space between consecutive knitting needles.

The arrangement in accordance with the present invention has scanning heads similar to those disclosed in a previous U.S. Pat. application Ser. No. 601,204, Dec. 12, 1966 (German application M 67647 VII*a*/ 25*a* D 3097). These scanning heads use phototransistors or photocells especially for white. In such a case it is possible to omit that portion of the circuitry in the recognition section, which recognizes white through the simultaneous appearance of signals in all three color inputs. When no phototransistors or photocells are specifically provided for white, and only individual colors are to be recognized (at least two), the invention provides that at the output of all the colors, except for white, corresponding normalized pulses are realized. The signals are recognized as white and then transmitted further.

With this solution, in accordance with the present invention, the program is written on a film with programmed marks so that the film may be photoelectrically scanned to provide functional commands for the machine to be controlled. The use of magnetic tape or punched paper tape or perforated tape, is equivalent to the illuminated film, and does not differ in principle from the present basic invention.

A further feature of the present invention is that in addition to providing normalized pulse signals corresponding to a systematic recognition of one color or all colors simultaneously, the color recognition circuit, provided, transmits an auxiliary recognition signal. In the event that this recognition signal is not transmitted, the mechanical motion of the scanning arrangement with respect to the pattern, as well as the lighting machine are stopped. This serves as a safety feature which assures that no incorrect pulse is transmitted to the lighting machine and that the scanning head is stopped at the incorrectly scanned location, when scanning errors prevail or malfunctions are introduced.

For the purpose of further increasing the safety of the arrangement in accordance with the present invention, the release of the lighting pulse is delayed by approximately 200 microseconds, for example, with respect to the corresponding color recognition or noncolor pulse. In this manner, assurance is had that the release signal is not transmitted before the color has been properly recognized.

In knitting machines, as for example, those in which systems are controlled for which the colors have not been recognized, signals are transmitted to a noncolor converter for the nonrecognized colors in the lighting release circuit. The signals are thus passed to the noncolor converter instead of the color recognition circuit. This pertains to the recognized colors including white.

The scanning head provided with photocells and preamplifiers, has, in addition, a channel for the nonreflected location of the optical flash. This channel is provided for controlling purposes.

A further feature of the present invention resides in the condition that the pattern has black grid locations to which no photocell or phototransistor may respond. Such black grid areas or locations serve the purpose for producing programmed tape whereby the machine is stopped or reversed in direction. This is especially applicable to needle cylinders or enclosure after the passage of a predetermined number of needles which change after a specific number of rows or from row to row.

SUMMARY OF THE INVENTION

An optical scanning arrangement in which program tape is produced by optically scanning a color pattern in a grid fashion. Photosensitive transistors or photoelectric cells are moved along a grid superimposed upon the color pattern to be scanned. The photosensitive elements detect the individual colors on the pattern and convert the optically color detected signals into corresponding electrical signals. These electrical signals from the photosensitive elements are then amplified in suitable preamplifiers and amplifiers to permit their processing. Pulse-shaping means is provided for each color that may be detected on the pattern. The purpose of the pulse-shaping means is to standardize the signals and to provide rectangular-shape pulses, corresponding to each color detected, which are of constant amplitude and pulse width. The pulses from the different pulse shapers are transmitted to a color recognition circuit which determines that the color has been properly detected and thereupon transmits a corresponding signal for recording on a predetermined or predesignated location on the programming tape. This tape may then be applied for the controlling of various machines such as knitting or weaving machines or knitting or weaving color patterns.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
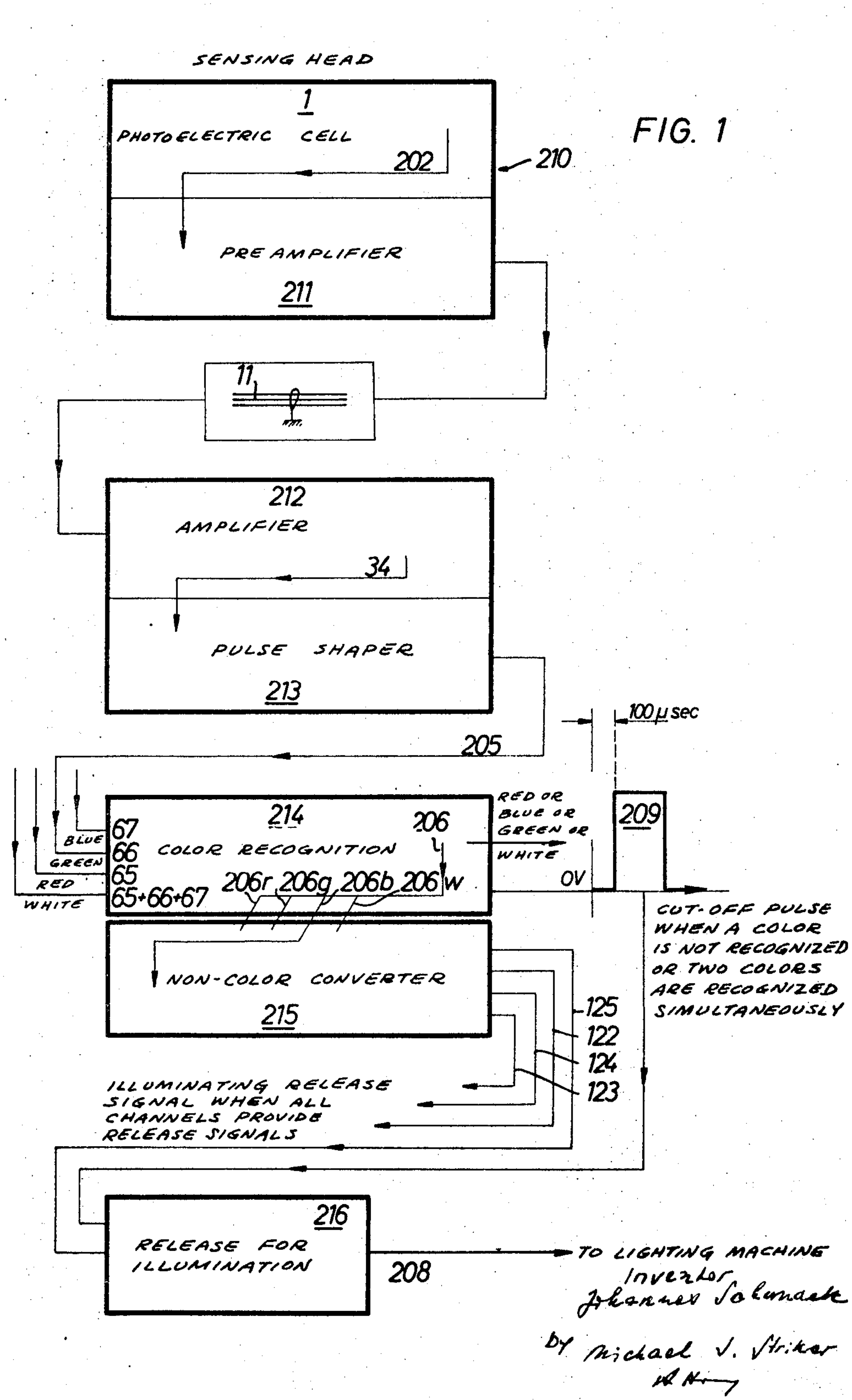
FIG. 1 is a functional block diagram and shows the arrangement of the scanning head in conjunction with the different controlling and sensing circuits for a particular color.

Referring to FIG. 1 of the drawing, the photoelectric cell 1 and the associated preamplifier 211, as described in the German Pat. application File M 67647 VII*a*/ 25*a* (D 3097), are mounted within a sensing head 210. The sensing or scanning head 210 scans with a width of a square mesh or grid, along a corresponding grid spacing or intermittently along a plurality of such grid spacings as prevailing, for example, in knitted fabric material, and in the direction of the stitch rows. After a predetermined number of stitch rows have been scanned, the scanning cycle is repeated with repetition of the pattern of the fabric about the periphery of the circular knitting machine. When a four-color pattern or fabric is scanned, the number of such predetermined knitting rows is six as mentioned above. At the beginning of the scanning motion and before the first of six stitch rows are scanned, the scanning head is advanced in the direction of the stitching pins in order to scan the next six rows, in this illustrative example. Thus, in the drawing, a photoelectric cell 1 and its associated preamplifier 211 are provided for a particular color. The electrical flash pulse 201 produces the optical flash pulse 202 which is lead to the amplifier 212 by way of a shielded conductor 11. The output of the amplifier 212 is the amplified pulse 34.

Figure 2:
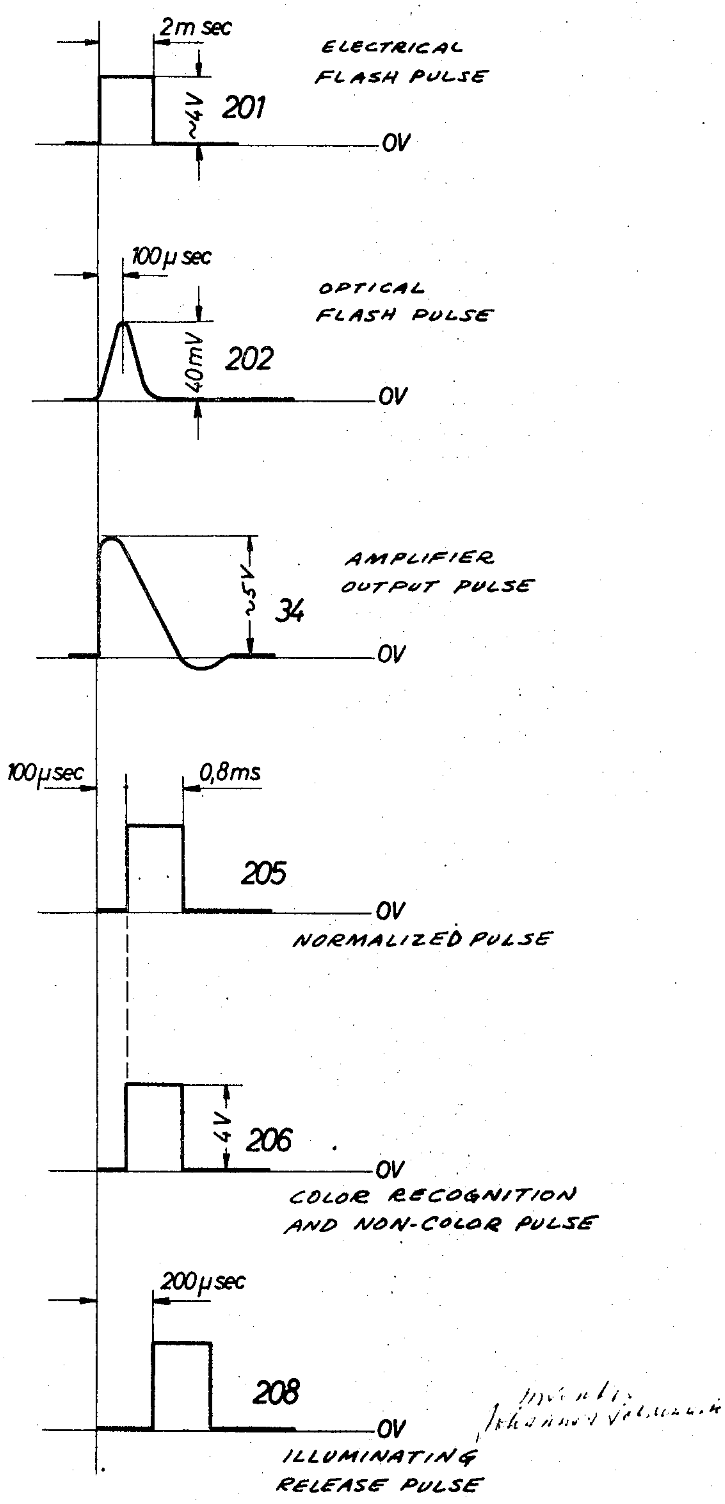
FIG. 2 is a waveform diagram and shows the shapes of the various signals at particular locations in the arrangement of FIG. 1.

The signals derived from the scanning process for red, green, and blue, for example, vary in magnitude and length depending upon the reflection properties of the medium being scanned and on the color and pattern as well as the scanning system. This may be seen from the aforementioned German patent application filed. As a result of such variation, these signals are not very applicable to a control process. Accordingly, the signals are converted to pulses 205 of constant height and pulse width and of rectangular shape. The amplified currents of the photosensitive transistor or photoelectric cell are therefore limited with respect to pulse height and pulse width. The output pulses of the amplifier attain a magnitude of approximately 5 volts as shown by the pulse 34 in FIG. 2. The front edge of this signal is relatively steep, whereas the trailing edge slopes much more gradually. The maximum duration of the signal is approximately 100 microseconds after the beginning of the light pulse shown in FIG. 202. The output signals 34 of the amplifier 212 are lead to a pulse normalizing circuit 213. At the output of the latter is provided a rectangular pulses 205 of equal height and duration. In this manner, proper recognition is realized even if the photosignals vary.

The signals 205 normalized from the signals derived from the photosensitive transistor or photocells, provide information with respect to the scanned stitches as, for example, whether red, blue, green or all three color channels (for white) have registered. Thus, only those color channels are to register, here, when they are specifically indicated, i.e., red, green, and blue. All three channels together register for the color white. With an orderly arrangement of the medium being scanned two colors as, for example, red and green or green and blue or blue and red cannot generate a signal. When, however, this condition does prevail, an error recognition situation applies. Within the recognition circuit 214, it is now determined which colors prevail—whether red or green, or blue or all colors together. As a result, a signal 206 of the normalized form 205 appears at one of the outputs 65 (red), 66 (green), 67 (blue) or (65+66+67) for white.

For every set of photosensitive transistors which scan a grid area for red, green, blue, or red and green or only one color "+ white," a color recognition circuit 214 is connected for the purpose of recognizing the color on the grid or screen or mesh area. The inputs of the three colors 65, 66 and 67 of the circuit 214 are the outputs of the pulse normalizing or pulse shaping circuit 213 associated with the three corresponding photosensitive transistors. When one of these colors or all colors together are recognized, a recognition signal 209 is transmitted at the same time. This signal indicates that an orderly recognition has been made.

If photosignals are produced at only one or two channels, this recognition signal 209 does not appear. A stop signal for the scanning arrangement 210 is thereby transmitted.

With three color material in the form of a two-color pattern on a white background, one or both of the colors can appear when nothing is drawn on the white background.

If scanning is carried out with three colors, then white is generated upon the simultaneous recognition of the three colors. With two color material in which the pattern is of one color, one signal may result for the particular color on the pattern as, for example, red. On the other hand, a red signal may result and a blue one for white. When none of the signals appear, the arrangement must be disconnected. The color recognition circuit 214 provides signals 206 in the form of, for example, 206 $r$ = red, 206 $g$ = green, 206 $b$ = blue and 206 $w$ = white. These signals, in the programmer, can be transmitted directly to the systems of the knitting machine for the purpose of controlling the latter when a particular color is recognized. Knitting machines or other machines are also available, based on the invention wherein system control is exercised when a particular color was not recognized. In this latter case, a noncolor converter 215 is required.

At every input of the noncolor converter, the signal 206*r*, 206*g*, 206*b* or 206*w*, which is transmitted from the outputs 77, 81, 96 and 85, from the color recognition circuit (FIG. 4), is obtained. On the four outputs 125 for red, 122 for green, 124 for white and 123 for blue, the signal is taken for the colors not recognized, and led to the lighting machine. For the two-color arrangement plus white, a corresponding situation prevails and the signal at one-color channel as, for example, red, produces at the output of the one-color converter 215, a signal on the green and white. For a one-color pattern or illustration on white background, a conversion is not necessary. This is because two colors of the white background and the illustration or pattern appear.

The signals derived from the color recognition circuit 214 or the noncolor converter 215 serve to illuminate the control strip in the lighting machine. A mark on the filmstrip is applied when the signals prevail. When the machine stops, the signal must not be transmitted to the lighting machine. This stop signal can be generated when no color has been recognized, corresponding to the condition, for example, when the color recognition circuit 214 does not provide a correct recognition signal. In such a case the film must not be illuminated. The signal appearing at the output of the color recognition circuit 214 or the noncolor converter 215 is thus released only in the circuit 216 when all scanned channels have a release signal 209.

The illumination release pulse 208 appears with a small delay after the recognition signal 206, in order that the pulse spikes do not provide disturbing effects at the input. A channel is provided next to the phototransistors or cells for the scanning process, in order to determine the optical flash. This channel is scanned directly from this optical flash and not from the reflection of the pattern. This channel is designated for the on-off automatic switching arrangement as well as the controlling arrangement.

If a quadrant of the fabric is black, the phototransistor does not become activated. This particular condition is, in special cases, usefully applied as, for example, in automatic stoppage of the machine.

The functional aspects of the electrical circuitry, in accordance with the present invention, is described below beginning with the phototransistor upon which light impinges and ending with the light beam of the lighting machine, which is directed at the filmstrip.

Figure 3:
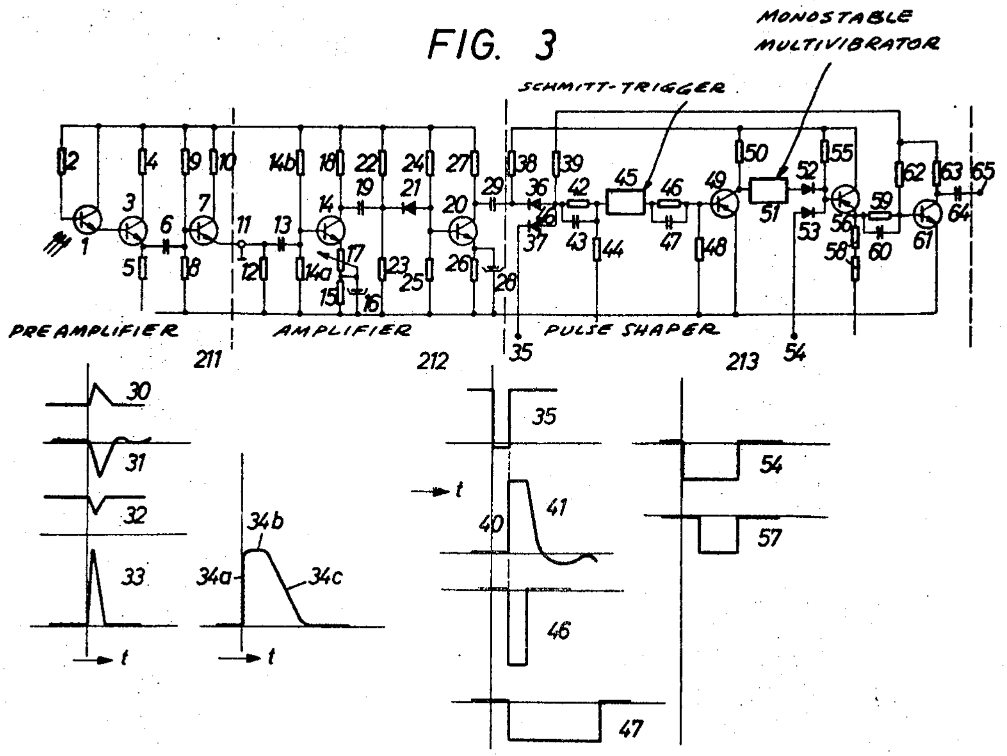
FIG. 3 is an electrical schematic diagram of the preamplifier, amplifier, and pulse shapers, shown in block form in the diagram of FIG. 1.

Referring to FIG. 3 for the scanning and normalizing process, the phototransistor 1 provides at its emitter a current pulse due to the light impinging upon the transistor. The phototransistor is driven with a voltage of the order of 12 volts. The base of the transistor is connected to the collector thereof by way of a large resistor 2. When light current does not prevail, a quiescent potential is present at the emitter. However, this is changed when light impinges resulting, in due course of time, in light current. In the preamplifier 211, the voltage provided at the emitter of the transistor 1 is directly transmitted to the base of the transistor 3. The latter functions as an emitter follower or an impedance converter. The collector voltage for the transistor 3 is applied through a resistor 4, whereas the emitter voltage for the transistor 3, is applied through the resistor 5. The emitter of this transistor has the same potential as its base, but an impedance conversion takes place upon the amplification of current. The emitter signal of the transistor 3 is transmitted further to the base of the transistor 7, by way of a capacitor 6. The latter serves the purpose of removing the DC component of the signal. The base potential of the transistor 7 is determined by a voltage divider composed of resistors 8 and 9. This second transistor 7 is also an emitter follower. The collector potential of the transistor 7 is established through the resistor 10. Through further impedance transformations, the emitter will provide signals relatively smaller than the input voltages. This voltage, however, has the same magnitude as the voltage prevailing at the base of the first transistor 3.

The phototransistor 1 with its free amplifier consisting of transistors 3 and 7, is contained within the movable scanning head 210. The output signal of the emitter of transistor 7, is led, via a coaxial cable or shielded cable 11, to a stationary amplifier arrangement 212. At that point, the cable is terminated through its characteristic impedance 12. The amplifier arrangement provides for an increase in the signal level.

The capacitor 13 inhibits the transmission of the direct current signal that may appear over the cable, and assures that only the alternating portion of the signal is transmitted. This alternating portion of the signal is transmitted to the base of the transistor 14. The operating level of the base of this transistor is determined by the resistors 14*a* and 14*b*. The transistor 14 operates as an amplifier. The amplification of this amplifier may be regulated corresponding to different signals that may be applied to it. In the emitter circuit resides a series network of RC components. The RC combination of components 15 and 16, is connected in series with the regulating potentiometer 17. The latter determines the operating level and hence the amplification of the transistor 14. A resistor 18 is connected to the collector of transistor 14. At this point in the circuit, an amplified voltage appears relative to the input voltage. The polarity of the output voltage signal is opposite to the polarity of the input. Thus, a positive input pulse appears as a negative pulse at the collector of transistor 14. The amplified signal at the collector of transistor 14, is applied to the base of transistor 20, by way of an attenuating circuit. The capacitor 19 is included in this transmission path. Connected to the coupling capacitor 19 is a diode 21 which has a voltage divider connected to each of its terminals. Thus, the voltage divider comprised of resistors 22 and 23 are connected to one terminal of the diode 21, whereas the voltage divider comprised of resistors 24 and 25 is connected to the other terminal of the diode. This diode serves as a clipping diode, in that it suppresses small oscillations about the quiescent point, and transmits to the base of the transistor only large spikes or peak signals. This is of particular importance since the removal of the small disturbing signals from the useful or operating signals is considerably simplified.

The transistor 20 operates, in a similar manner, as an amplifier whereby its operation is determined by the emitter resistor 26 and the collector resistor 27. For the purpose of increasing the amplification, the emitter resistor is connected in parallel with a capacitor. In this manner, the operating or actuating signals are higher amplified whereas the DC potential within this stage is maintained constant. The amplified voltage is transmitted from the collector via the capacitor 29.

For the purpose of illustrating the functional operation of the amplifier, signal timing diagrams are provided. The waveform 30 shows the signal applied to the emitter of the phototransistor which provides the input signal to the amplifier beyond the cable. At the collector of the first transistor 14 of the amplifier, a clean signal 32 appears with the unaffected base line, through the clipping action of the diode 21. This signal is reversed in polarity at the collector of the amplifier as shown by the signal 33.

As indicated supra, the output signal at the output terminal of the capacitor 29 is dependent upon the reflection of the pattern being scanned. The amplitude and timing of the signal varies as a function of the reflection properties. The amplitude should not drop below a minimum value. This implies that a limiting characteristic must be provided by the amplifier. The duration of the signal must, however, be varied because the pulse width is increased when large intensities of light prevail. On the basis of the task to be carried out, it may be seen that the three amplified signals for the red, green and blue channels are to be compared with respect to each other. Since these three signals do not have identical time intervals or durations, as described above, they are converted to signals of identical durations by means of the pulse normalizing circuit 213. This signal should be a rectangular signal of constant amplitude, duration and phase with respect to time. The problem is therefore one of determining whether a signal appears from the amplifier and whether for this case, a normalized signal is shaped. As shown by the waveform diagram, the amplified photosignal has a steep front edge 34*a*, a top portion 34*b*, and a graded trailing edge 34*c*. This signal is now led to a gating circuit comprised of two diodes 36 and 37. The signal is transmitted to one diode whereas a rectangular signal in the form of the first clock pulse 35 is led to the other diode. The clock signal begins at the time of the release of the optical flash, and terminates approximately at the instant at which the photosignal attains its maximum value. By means of the resistors 38 and 29, the two diodes 36 and 37 are biased so that only when both signals appear, can the quiescent voltage at the junction point 40, of the two diodes, be changed. If only one signal appears, or no signal at all prevails, the quiescent potential is retained. This signal deviates or varies from its quiescent potential in accordance with the timing signal or waveform 41. The diode network is arranged so that a signal differing from the quiescent potential is generated when the first clock volts is not provided but the illumination pulse or lighting pulse does appear. Thus, at the terminal 35 a pulse appears which is delayed with respect to the beginning of the optical signal but is made steeper and sharper with definitive characteristics. Whereas the front portion of the signal is altered the trailing edge of the photosignal is not modified. The resulting signal is transmitted to a Schmitt-trigger circuit 45 by way of an RC network 42–43 and a voltage dividing resistor 44. An amplifier is connected to the Schmitt-trigger circuit for the purpose of amplifying the signals provided by the latter. The Schmitt-trigger circuit has the characteristic whereby it can provide an output of two possible potentials corresponding to a DC input. Thus, a potential may be provided in the form of a reference level when no signal prevails at the input. This implies that from the signal 41 a signal 46 is generated so that the front edge coincides with the front edge of the signal 41. The trailing edge of the signal 46, however, is determined by the operating level of the Schmitt trigger which removes the oscillations and graded trailing edges of the signal 41. Accordingly, a rectangular pulse is generated in which the front edge coincides with the trailing edge of the first clock pulse. At the same time, the trailing edge of this rectangular pulse is displaced in time with respect to the first clock pulse.

The functional operation of a Schmitt-trigger circuit is well known in the art, and the disclosure is based on this condition. The output signal of the Schmitt trigger is applied to the base of a transistor 49 by way of a further RC combination 46–47, and a resistor 48. The transistor 49 operates as an amplifier. A signal appears across the collector resistor 50 with opposite polarity as shown by the waveform 46. This voltage signal is applied to the monostable multivibrator 51. The functional operation and construction of such monostable multivibrator is also well known in the art. The monostable multivibrator provides at its output a signal which is a rectangular-shaped signal as shown by the waveform 47. The front edge of the signal coincides with the trailing edge of the first clock pulse. The trailing edge of this signal 47 is determined by the pulse duration as established by the monostable multivibrator circuit. This pulse is chosen to be notably longer than the one provided by the Schmitt trigger. As a result, a rectangular pulse is obtained of definite magnitude and definite rise time, but of varying width or length for individual scanning arrangements. In order to make a comparison, however, all pulses, in the amplifier channels, must be of equal length. For this purpose, a second pulse is introduced by way of two diodes. This pulse has the same duration for all scanning channels. This pulse is the so-called clock pulse 54. The pulse begins with the flash control pulse and terminates before the one provided by the monostable multivibrator.

The gating circuit composed of diodes 52 and 53 with resistor 55 is designed so that a rectangular pulse appears at the base of the transistor 56, when both of the two pulses are applied. No signal is generated, however, when only one or none of the signals are applied. Accordingly, the base of the transistor 56 has a signal of the waveform 57. The transistor 56 is an emitter follower for transforming the impedance with the emitter resistor 58. Thus, the control signal supplied to the transistor 56 is of relatively low impedance. The signal is transmitted to the base of transistor 61 by way of RC network 59–60. This transistor has a base resistor 62. The transistor functions in the form of an amplifier. Across the collector resistor 63 appears a signal which is opposite in polarity to the signal on the base, but which has the same duration. The capacitor 64 serves the purpose of removing the DC component from the output signal of transistor 61.

The pulse appearing at the circuit location 64 is a normalized "color pulse" and is, at all scanning outputs, of equal magnitude, duration, and phase relationship. It is thereby possible to make a comparison of the different signals. Since only one phototransistor 1 is shown in FIG. 3, only one output 65 at the pulse shaper or pulse normalizer is shown in FIG. 4.

Figure 4:
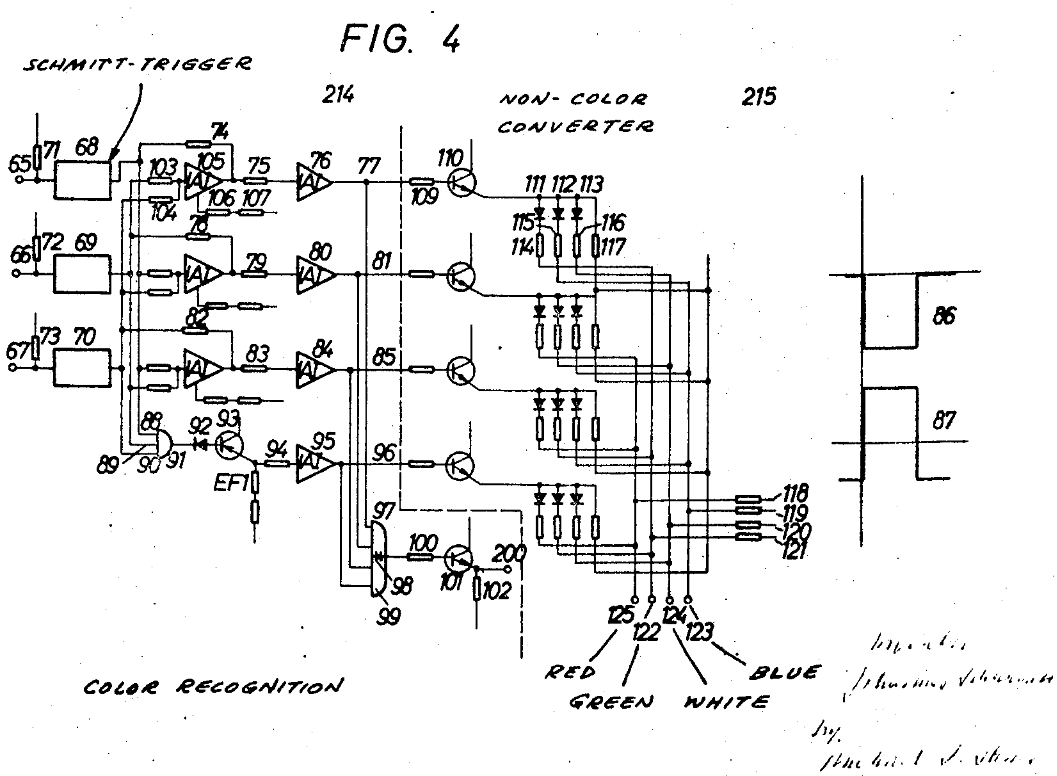
FIG. 4 is an electrical schematic diagram of the color recognition circuit and noncolor converter shown in block form in their interrelationship in FIG. 1.

Referring to the color recognition circuit of FIG. 4, the pulse shaper provides pulses for, for example, red, green and blue signals. These pulses must be used in order to illuminate the control strip. This implies the following:

a. If a signal appears at the output of one of the three pulse shapers 213 for red, green, or blue, then this signal must be recognized and further transmitted.

b. If signals appear at all three outputs, implying that red, green and blue reflect at the same time, then no color has been introduced on the pattern or drawing and white must be recognized.

c. No signal appears at any of the three outputs and therefore no signal must be recognized.

d. A signal appears at two channels. Under an orderly arrangement, this is not possible, since the pattern was generated with either red or green, or blue or no color. Thus, when for any reason of malfunctioning as, for example, poor presentation of the pattern, two colors are in fact recognized, no recognition signal must be transmitted. The scanning and film illumination equipment must also then be turned off.

The conversion of the three possible normalized color signals into the recognition signals 209, is accomplished in the color recognition circuit 214. The process is carried out by means of the circuit shown in FIG. 4. Applied to the terminals 65, 66 and 67 are pulses from the pulse-normalizing circuit, in the form described supra. These terminals are connected to the inputs of the Schmitt-trigger circuits 68, 69 and 70. The operation levels of these Schmitt-trigger circuits are determined by the input resistors 71, 72 and 73. These Schmitt triggers serve the purpose of amplifying the signal and reversing their polarities.

It is also possible to apply here other means for accomplishing the desired results. At the same time any slope in the top edge of the pulses may be eliminated. Such slopes in the pulses result from the differentiation effects of the capacitors 64 and input resistors 71, 72 and 73.

The operational conditions *a* to *d* are now considered:

a. A single color signal red or green or blue. The output signals of the Schmitt triggers 68, 69 and 70 have the waveform shown as 86, and are applied to amplifiers 76, 80, and 84 by way of resistors 74 and 75, 78 and 79, and 82 and 83. The emitter potentials of these transitor amplifiers are such that when no pulses prevail at the terminals 65, 66 and 67, the transistors are in their conducting states, whereas they are cut off or nonconducting when pulse signals appear at these terminals. The output pulses of the transistorized amplifiers have the waveform 87. Since only one channel is operational in this particular case, the other two channels do not provide any signals to the circuitry.

b. Three recognized colors red, green and blue at terminals 65, 66, and 67 provide an output signal for white and no signal for red, green and blue. At the outputs of the Schmitt-trigger circuits 68, 69 and 70, three similar signals are thereby generated. These signals are led to the inputs 88, 89, and 90 of a diode gating circuit 91. The later is an AND gate which provides a signal at its output only when all three input signals are present. The output of the gating circuit 91 is applied, by way of a diode 92, to an emitter follower 93. The output of the emitter follower 93 is, in turn, applied to an amplifier 95 via the resistor 94. The functional operation of the amplifier 95 is similar to that described above for the amplifier 76. Thus, if red, green, and blue signals appear, an output signal results behind the amplifier 95. At the same time, however, no output signals appear at the amplifiers 77, 81, and 85. As a result, a signal appears at the junction of resistors 74 and 75, 78 and 79, or 82 and 83, which originates from the color channel not directly actuated. With a one-color arrangement, a signal appears at the junction of resistors 74 and 75 when red is detected. If, at the same time, green and blue are detected in addition to red, the amplifier 105 becomes operational through means of resistors 103 and 104. The operational level of the amplifier 105 is determined by the resistors 106 and 107. When voltage signals appear at one of the undesired outputs, the signal is reversed by the amplifier 105 and no pulse appears at the junction point of resistors 74 and 75. The implication of this is that at the output 77, no pulse appears, as long as two or three inputs 65, 66, and 67 have a pulse applied to them. The channels for the second and third color operate in a similar manner.

c. If two colors appear, then as in b above, no output signal prevails. This applies whether the signal is for red, green, blue or white. The same situation prevails when no signal is applied.

d. No input signal. At the outputs 77, 81, 88, and 96, a signal appears. As a result, the color recognition circuit provides an output signal corresponding to the input signals of the three colors red, green and blue, either for one of these colors or for all of them in the form of white. When one of these signals appears at the output then a recognition signal is provided at the same time. This indicates that at any one of the outputs, a recognized signal prevails. For the purpose of operating on this recognition signal, the diodes of a gating circuit 97 are actuated by the outputs 77, 81, 85, and 96. The gating circuit 97 is composed of individual diodes 98 and a resistor 99. An output appears at the gating circuit 97 only when one of the inputs has a signal applied to it. No signal appears at the output of the gating circuit when several inputs are applied or when no input prevails. The output of the gating circuit is applied to an emitter follower, by way of resistor 100. The emitter follower is comprised of transistor 101 having the emitter resistor 102. The so-called recognition signal 209 is taken from the output terminal 200. This recognition signal 209 has the same time duration, the same amplitude, and the same phase relationship for red, green and blue or white. This signal is then further applied in a particular manner.

Referring to the noncolor converter for a four-color condition in FIG. 4, consider the situation when in a knitting machine the needle for a designated color appearing on a fabric, does not operate. If, further, those needles are operating which correspond to colors that are not to appear, the recognized signal for one of the colors red, green, blue or white, must be converted into signals of the three not-recognized colors. This occurs in the so-called noncolor converter 215. In this example, this may be made into a recognized red signal. At the output of the recognition circuit for red, a signal of the form described supra, appears for red at the junction or circuit point 77. This signal is applied, by way of a resistor 109, to an emitter follower consisting of transitor 110. Connected to the emitter of this transistor 110, are three diodes 111, 112 and 113. The outputs of these diodes are further transferred by way of resistors 114, 115, and 116. For the purpose of establishing the DC potential of the emitter, a resistor 117 is connected between the emitter and the circuit power supply. The diodes are biased so that when no input signals prevail, they are cut off. When, on the other hand, signals appear at their inputs, they are in their conducting state and they provide current by way of the resistors 114, 115 and 116. The signals from the resistors 114, 115, and 116 lead to the output circuit for green, white and blue, which are provided with additional resistors 118, 119, 120 and 121. At the output terminals 122, 123, and 124 for the green, blue and white channel, voltage signals appear when the base of the associated emitter follower 110 has a pulse applied to it. At the same time, however, no signal can appear at the output 125 for red. This is because this output terminal 125 has no connection with the emitter follower for the red channel. The outputs 125, 122, 123, and 124 lead to the illumination systems. Whereas the diodes 111, 112, and 113 in the red channel are conductive in relation to the applied pulse, the corresponding diodes in the green, blue, and white channels are blocked or cut off. Furthermore, the voltage signals appearing at the outputs 121, 122 and 123 cannot appear in the emitter followers of the three not recognized colors. When another color as, for example, green or blue or white appears, the diodes associated with these color channels become conductive and the red becomes cut off. Accordingly, when one of the colors appears, a signal prevails at the outputs of the three other colors, and is used for controlling purposes.

It is to be understood that for every pulse shaper or pulse normalizer 213, a color recognition circuit 214 is provided. When necessary, a noncolor converter 215 is also provided with each color recognition circuit 214.

Figure 5:
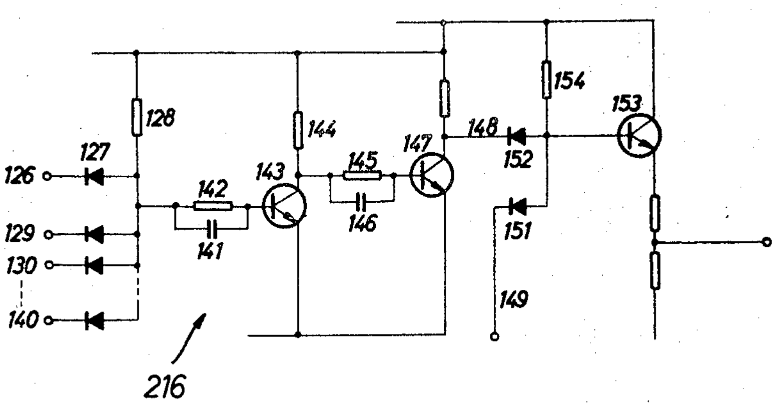
FIG. 5 is an electrical schematic diagram of the signal release circuit shown in block form in the arrangement of FIG. 1, in accordance with the present invention.

For the purpose of illustrating the design and operation of the illumination release circuit of FIG. 5, signals are realized from the color recognition circuit as a result of the condition that the latter provides a signal at its output and, at the same time, a recognition signal. If now a plurality of rows are scanned simultaneously on the fabric, a color signal and a recognition signal will appear for every one of these rows. The color signal appears at the output and can be further applied.

It is possible, that in a particular case, for illustrative purposes, that six simultaneous signals are applied at the illuminating positions of the illuminating or lighting machine, it is possible, furthermore, that five of these six signals indicate recognition and that the sixth signal does not provide any such recognition. This implies that no color signal and no recognition signal appears. In this case, failure indications may arise which may be used with respect to the recognized channels for illuminating the strip. This may, however, lead to difficulties since two different signals may be provided for one row after another. Accordingly, incorrect markings may result. Therefore, when the recognition signal fails with respect to one of the rows being scanned, any information to the illumination or lighting machine must be inhibited. Expressed in other terms the signals may be transmitted further only when the recognition signal is determined for all channels. This occurs in the release circuit 216. This determination is made through comparison with a normalized recognition pulse. This normalized pulse is led to a terminal 126 of a diode 127. The diode is made conductive by this pulse and, as a result, the voltage of the pulse appears across the resistor 128. The same signal appears across the resistor 128 when similar signals are applied to the diode terminals 129, 130 to 140, implying that the recognition signal has been applied for these channels. The number of diodes (129 to 140) is determined by the number of rows on the fabric or pattern to be scanned simultaneously. If six rows are involved, then six diodes are necessary, if eight rows are involved, eight diodes are necessary, and when 12 rows are to be scanned, then 12 diodes are required. The recognition signal is applied to an amplifier by way of the RC network 141–142. The amplifier is comprised of a transistor 143 having a collector resistor 144. At the collector, therefore, appears a normalized recognition signal of opposite polarity. This new polarity of the signal is therefore the same as the original old polarity. The output signal at the collector of the transistor 143 is applied to the base of a transistor 147, by way of the RC network 145–146. The transistor 147 serves as an amplifier providing an output at its collector 148. Thus, the 12 recognition signals applied to the diodes 129 to 140 are brought together. During the time intervals between recognition signals, these diodes acquire a negative voltage and are, thereby, made conductive. When the recognition signals arrive, all 12 diodes become cut off. Accordingly, a positive potential, in relation to the quiescent state of the circuit, appears across the resistor 128. When, on the other hand, a diode becomes conductive, the negative potential is retained during this interval. Therefore, during the intervals between pulses the same voltage level prevails at the following amplifier.

The diodes 129 to 140 are joined together and are fed from the color recognition signals. The input signals are negative during the time intervals between scannings. When a recognition signal appears, they become positive. The diodes conduct during the periods of time between scanning signals, and are cut off, on the other hand, while the scanning takes place. If, now, during scanning, a number of channels provide recognition, all of these diodes are cut off. Accordingly, a positive signal appears across the resistor 128. The positive potential or level of this signal differs from that during the time interval between pulses. When one of these diodes becomes conductive because a pulse is not received on one of the color recognition circuits, a diode remains conductive, during this time interval, in which the recognition signals are provided. As a result, a negative potential appears across the resistor 128. This implies that no further differences are made between the voltage levels of the recognition signals following each other and the recognition itself. In this case therefore a recognition signal is no longer applied to the circuit location 128, and as a result, no recognition signal appears behind the amplifier.

Thus, the pulse at the circuit location 148 appears only then when all scanned channels have provided release signals, implying that the illuminating or lighting machine may be actuated. When such a pulse does not appear, a pulse does not similarly appear at the circuit location 148, and the illuminating or lighting machine may not be actuated. This pulse is then used in the following manner.

The output pulse from the noncolor converter is applied, by way of a separate circuit, to the terminal 149, corresponding to the cathode of a diode 151. Furthermore, the recognition pulse is led from the circuit location 148 by a further contact 150 of the diode 152. Both pulses have zero voltage levels when no signals prevail, and, on the other hand, become positive when signals do appear. As long as one of these diodes has a zero-voltage level, it becomes conductive and, as a result, the base potential of the transistor 153 is also zero or null. This base is otherwise made positive as a result of the resistor 154. The base of this resistor is therefore maintained at positive potential when both diodes are cut off, implying that a normalized recognition pulse appears as well as the signal from the two-color converter. As a result, a positive potential will exist at the emitter of the emitter follower 153. When this normalized recognition signal does not arrive, the diode remains conductive, and accordingly the emitter remains at zero potential. Accordingly, no signal is provided at the output when the recognition signal fails to appear or the signal from the noncolor converter fails to be transmitted.

It will be understood that each of the elements described above, or two or more together, may also find a useful application in other types of optical scanning arrangements differing from the types described above.

While the invention has been illustrated and described as embodied in optical scanning arrangements, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

I claim:

1. An optical scanning arrangement for producing programming tape by optically scanning a pattern comprising, in combination, photosensitive means for scanning said pattern to detect colors thereon and generate signals in relation to the colors detected; amplifying means connected to said photosensitive means for amplifying said signal; pulse-shaping means connected to said amplifying means for producing for each color detected on said pattern a rectangular-shaped pulse of constant amplitude and duration; color recognition means connected to said pulse-shaping means for receiving the output signals from said pulse-shaping means; and noncolor converter means connected to said color recognition means and transmitting further signals corresponding to the colors not recognized to predetermined positions on said programming tape, whereby the latter has reproduced on it the color characteristics of the colors not recognized of a pattern scanned by said photosensitive means.

2. An optical scanning arrangement for producing programming tape by optically scanning a screened color pattern comprising, in combination, photosensitive means for scanning said pattern to detect the colors thereon and generate signals in relation to the colors detected, said photosensitive means converting the optical color signals detected by said photosensitive means into corresponding electrical signals; amplifying means connected to said photosensitive means for amplifying said electrical signals; pulse-shaping means connected to said amplifying means for producing for each color detected on said pattern pulse signals of constant amplitude, duration and phase relationship; color recognition means connected to said pulse-shaper means for receiving the output signals from said pulse-shaper means; and information applying means connected to said color recognition means for applying to predetermined locations on said programming tape signals identifying the scanned colors recognized by said color recognition means, so that said tape has reproduced on it the color characteristics of a pattern scanned by said photosensitive means and having at least two colors including white, said color characteristics being reproduced on said tape as a function of the positions of said colors on said pattern, wherein said photosensitive means are arranged to recognize at least two individual colors and transmit thereupon signals to said pulse-shaping means, said color recognition means providing a signal for recognition of color white when all colors excluding white are detected by said photosensitive means.

3. The optical scanning arrangement as defined in claim 18 including means within said color recognition means for providing a recognition signal when all colors on the scanned pattern have been correctly recognized, the scanning of said pattern being stopped when said recognition signal is not generated.

4. An optical scanning arrangement for producing programming tape by optically scanning a screened color pattern comprising, in combination, photosensitive means for scanning said pattern to detect the colors thereon and generate signals in relation to the colors detected, said photosensitive means converting the optical color signals detected by said photosensitive means into corresponding electrical signals; amplifying means connected to said photosensitive means for amplifying said electrical signals; pulse-shaping means connected to said amplifying means for producing for each color detected on said pattern pulse signals of constant amplitude, duration and phase relationship; color recognition means connected to said pulse-shaper means for receiving the output signals from said pulse-shaper means; information applying means connected to said color recognition means for applying to predetermined locations on said programming tape signals identifying the scanned colors recognized by said color recognition means, so that said tape has reproduced on it the color characteristics of a pattern scanned by said photosensitive means and having at least two colors including white, said color characteristics being reproduced on said tape as a function of the positions of said colors on said pattern; and means in said photosensitive means for inhibiting the generating of a signal when the pattern scanned has a black colored area.

5. An optical scanning arrangement for producing programming tape by optically scanning a screened color pattern comprising, in combination, photosensitive means for scanning said pattern to detect the colors thereon and generate signals in relation to the colors detected, said photosensitive means converting the optical color signals detected by said photosensitive means into corresponding electrical signals; amplifying means connected to said photosensitive means for amplifying said electrical signals; pulse-shaping means connected to said amplifying means for producing for each color detected on said pattern pulse signals of constant amplitude, duration and phase relationship; color recognition means connected to said pulse-shaper means for receiving the output signals from said pulse-shaper means; information applying means connected to said color recognition means for applying to predetermined locations on said programming tape signals identifying the scanned colors recognized by said color recognition means, so that said tape has reproduced on it the color characteristics of a pattern scanned by said photosensitive means and having at least two colors including white, said color characteristics being reproduced on said tape as a function of the positions of said colors on said pattern; and illuminating release means for releasing an illuminating signal for recording on said programming tape.

6. The optical scanning arrangement as defined in claim 19 including means in said illuminating release means for delaying the release signal transmitted therefrom in relation to the signals received by said illuminating release means from said color recognition means.

7. The optical scanning arrangement as defined in claim 6, wherein said delay is substantially 100 microseconds.

8. The optical scanning arrangement as defined in claim 6, including means in said illuminating release means whereby the latter transmits said release signal only when signals from said pulse-shaping means indicate that all colors have been correctly recognized.

9. An arrangement for applying information to a controlling tape for controlling the operation of a surface pattern-producing machine comprising, in combination, movable scanning means for scanning a screened color pattern; photoelectric cells within said scanning means for sensing the colors on said pattern, the number of said photoelectric cells being equal to the number of colors on said pattern, each of said photocells being sensitive to only one color; amplifying means connected to each of said photocells for amplifying the electrical signals transmitted by said photocells; pulse-normalizing means connected to said amplifying means for converting electrical pulse signals from said amplifying means into pulses of equal amplitude, duration and phase relationship; color recognition means connected to said pulse-normalizing means having color outputs equal in number to the colors on said pattern; information applying means connected to said color recognition means for applying to a predetermined position on said tape a signal identifying a scanned color recognized by said color recognition means; and OR circuit in said color recognition means and connected to all said color outputs for actuating said information applying means only when one signal appears at said color outputs, whereby the color characteristics of said pattern having at least two colors are recorded at predetermined locations on said tape, said color characteristics being recorded on said tape as a function of the positions of said colors on said pattern.

10. The arrangement as defined in claim 9 including means in said color recognition means and connected to all outputs of said pulse-normalizing means for transmitting to said information applying means a signal representing white when signals appear simultaneously at all outputs of said pulse-normalizing means, said pattern having at least three colors including white and said scanning means having as many photoelectric cells as colors on said pattern excluding white, said color recognition means having as many color outputs as the number of colors on said pattern including white.

11. The arrangement as defined in claim 9 including release circuit means connected to the output of said OR circuit means and having an output connected to said information applying means for releasing said information applying means to record on said tape only when said color recognition means recognizes uniquely only one color for each of said color outputs, the number of said photoelectric cells, amplifying means and false normalizing means corresponding to the number of spots scanned simultaneously on said pattern.

12. The arrangement as defined in claim 9 including tape transport means for controlling the longitudinal motion of said tape; actuating means linked to said scanning means for actuating said scanning means; and means for connecting the output of said OR circuit means with said tape transport means and said actuating means for stopping the motion of said tape and rendering said scanning means inoperable when an output signal from said OR circuit means fails to appear.

PO-1050
(5/69)

UNITED STATES PATENT OFFICE
CERTIFICATE OF CORRECTION

Patent No. 3,578,976 Dated May 18, 1971

Inventor(s) Johannes Schunack

It is certified that error appears in the above-identified patent and that said Letters Patent are hereby corrected as shown below:

In claim 3, line 1, "claim 18" is corrected so as to read -- claim 2 --.

In claim 6, line 1, "claim 19" is corrected so as to read -- claim 5 --.

Signed and sealed this 11th day of April 1972.

(SEAL)
Attest:

EDWARD M.FLETCHER,JR.
Attesting Officer

ROBERT GOTTSCHALK
Commissioner of Patents